(12) United States Patent
Sato et al.

(10) Patent No.: US 8,858,909 B2
(45) Date of Patent: Oct. 14, 2014

(54) CARBON NANOTUBE AND METHOD FOR PRODUCING SAME

(75) Inventors: Yoshinori Sato, Miyagi (JP); Kazuyuki Tohji, Miyagi (JP); Masaru Namura, Tokyo (JP)

(73) Assignees: Dowa Holdings Co., Ltd., Tokyo (JP); Tohoku University, Miyagi (JP)

( * ) Notice: Subject to any disclaimer, the term of this patent is extended or adjusted under 35 U.S.C. 154(b) by 259 days.

(21) Appl. No.: 13/376,564

(22) PCT Filed: May 28, 2010

(86) PCT No.: PCT/JP2010/059492
§ 371 (c)(1),
(2), (4) Date: Dec. 6, 2011

(87) PCT Pub. No.: WO2010/143585
PCT Pub. Date: Dec. 16, 2010

(65) Prior Publication Data
US 2012/0083408 A1    Apr. 5, 2012

(30) Foreign Application Priority Data

Jun. 11, 2009   (JP) ................................. 2009-139927
May 21, 2010   (JP) ................................. 2010-116874

(51) Int. Cl.
| | |
|---|---|
| *B01J 21/18* | (2006.01) |
| *C01B 31/00* | (2006.01) |
| *C01B 31/02* | (2006.01) |
| *H01B 1/04* | (2006.01) |
| *B82Y 30/00* | (2011.01) |
| *B82Y 40/00* | (2011.01) |

(52) U.S. Cl.
CPC ............ *C01B 31/0233* (2013.01); *B82Y 30/00* (2013.01); *B82Y 40/00* (2013.01); *C01B 2202/20* (2013.01); *C01B 31/026* (2013.01); *Y10S 977/742* (2013.01); *Y10S 977/75* (2013.01); *Y10S 977/844* (2013.01)
USPC ................. 423/445 R; 423/447.1; 423/447.2; 423/447.6; 977/742; 977/750; 977/844

(58) Field of Classification Search
CPC .............. C01B 31/026; C01B 31/0233; C01B 2202/20; C01B 31/022; C01B 31/0226; C01B 31/0286; B82Y 30/00; B82Y 40/00; H01M 4/04; H01M 4/0471; C09C 1/48; C09C 1/50; C09C 1/54; C09C 1/56
See application file for complete search history.

(56) References Cited

U.S. PATENT DOCUMENTS

| | | | |
|---|---|---|---|
| 7,008,605 B1 * | 3/2006 | Benavides | ................. 423/447.1 |
| 2006/0042927 A1 * | 3/2006 | Benavides | ..................... 204/173 |
| 2008/0217161 A1 * | 9/2008 | Mathur et al. | ................ 204/173 |

FOREIGN PATENT DOCUMENTS

| | | |
|---|---|---|
| JP | 2003081616 | 3/2003 |
| JP | 2004210555 | 7/2004 |

(Continued)

OTHER PUBLICATIONS

Machine translation of Takimoto (JP2005-022902).*
Young Soo Park et al., Low pressure synthesis of single-walled carbon nanotubes by arc discharge, Synthetic Metals, Feb. 14, 2002, vol. 126, No. 2/3, pp. 245-251.
Shinya Iwata et al., Novel Method to Evaluate the Carbon Network of Single-Walled Carbon Nanotubes by Hydrogen Physisorption, The Journal of Physical Chemistry C Letters, Sep. 22, 2007, vol. 111, pp. 14937-14941.

(Continued)

*Primary Examiner* — Jun Li
(74) *Attorney, Agent, or Firm* — Bachman & LaPointe, P.C.

(57) ABSTRACT

There is provided a high-purity carbon nanotube, which can be produced with simple purification by causing graphite to be hardly contained in crude soot obtained immediately after being synthesized by arc-discharge, and a method for producing the same. Soot containing carbon nanotubes produced by arc-discharge using an anode which contains amorphous carbon as a main component is heated at a temperature of not lower than 350° C. to be burned and oxidized, immersed in an acid, heated at a temperature, which is not lower than the heating temperature in the previous burning and oxidation and which is not lower than 500° C., to be burned and oxidized, and immersed in an acid again.

11 Claims, 10 Drawing Sheets

(56) References Cited

FOREIGN PATENT DOCUMENTS

| | | |
|---|---|---|
| JP | 2005022902 | 1/2005 |
| JP | 2006016282 | 1/2006 |

OTHER PUBLICATIONS

International Search Report for PCT/JP2010/059492, Published 2012.

* cited by examiner

CARBON NANOTUBE AND METHOD FOR PRODUCING SAME

TECHNICAL FIELD

The present invention relates generally to a carbon nanotube and a method for producing the same. More specifically, the invention relates to a single-walled carbon nanotube and a method for producing the same.

BACKGROUND ART

Carbon nanotubes have the structure that is formed by cylindrically winding thin layer(s) of graphite crystals, i.e., planar or curved graphene sheet(s) formed by arranging six-membered rings of carbon molecules as hexagonal patterns. The diameter of carbon nanotubes is in the range of from a few nanometers to several tens of nanometers, and the length thereof is not less than tens of times to thousands of times as long as the diameter thereof. Such carbon nanotubes are classified into single-walled carbon nanotubes formed by cylindrically winding a substantially single graphene sheet, and multi-walled carbon nanotubes formed by cylindrically winding two or more of graphene sheets.

Single-walled carbon nanotubes have a small outer diameter and a large surface energy. Therefore, each of carbon nanotubes does not separately exist as a single carbon nanotube, so that a plurality of carbon nanotubes gather to form bundle(s) to be stabilized. Although multi-walled carbon nanotubes have properties, such as electrical conductivity, high elasticity and high strength, single-walled carbon nanotubes have different properties from those of multi-walled carbon nanotubes. For example, single-walled carbon nanotubes have such electric properties that they become metallic and semi-conductive, such mechanical properties that they are very tough and highly elastic, such thermal properties that they have thermal conductivity superior to diamond, and such absorption and occlusion properties that they absorb and occlude molecules. Due to such properties, it is expected that single-walled carbon nanotubes are applied to various technical fields, such as fields of hydrogen absorbing materials, antistatic agents, electrically conductive inks, field effect transistors, fuel-cell catalyst carriers, and anode materials of secondary cells.

Carbon nanotubes are generally produced by various methods, such as arc-discharge, laser vapor deposition, and thermal CVD (chemical vapor deposition) methods. In the arc-discharge method among these methods, a voltage is applied between carbon electrodes, which are spaced from each other by a few millimeters in an inert gas, to deposit carbon nanotubes on a cathode by arc-discharge (see, e.g., JP 2004-210555 A and JP 2006-16282 A), and it is possible to inexpensively produce carbon nanotubes having smaller structural defects than those produced by other methods. In the arc-discharge method, it is possible to selectively produce single-walled or multi-walled carbon nanotubes in accordance with the presence of catalytic metals filled in a carbon rod, and it is also possible to control the diameter and length of carbon nanotubes in accordance with the kind of catalytic metals.

However, in conventional methods for producing carbon nanotubes by arc-discharge, such as the methods disclosed in JP 2004-210555 A and JP 2006-16282 A, a graphite rod filled with catalytic metals is used as an anode. For that reason, large amounts of amorphous carbon, nanoparticles (particles having a size of a few nanometers) of catalytic metals, graphite sputtered from the graphite rod are contained in crude soot obtained immediately after being synthesized by arc-discharge, so that there is a problem in that the purity of synthesized carbon nanotubes is low. Among these impurities, amorphous carbon can be easily removed by burning and oxidizing the crude soot, and the catalytic metals can be easily removed by treating the crude soot with an acid. However, in order to remove graphite from the crude soot, it is required to carry out centrifugal separation after a surface active agent is added to the crude soot, and it is also required to carry out a size exclusion chromatography, so that it takes a great deal of time. In addition, there is a problem in that defects are applied to the structure of carbon nanotubes by carrying out such purifying steps.

DISCLOSURE OF THE INVENTION

It is therefore an object of the present invention to eliminate the aforementioned problems and to provide a high-purity carbon nanotube, which can be produced with simple purification by causing graphite to be hardly contained in crude soot obtained immediately after being synthesized by arc-discharge, and a method for producing the same.

In order to accomplish the aforementioned and other objects, the inventors have diligently studied and found that it is possible to produce a high-purity carbon nanotube, which can be produced with simple purification by causing graphite to be hardly contained in crude soot obtained immediately after being synthesized by arc-discharge, if an amorphous carbon rod (a lowly graphitized carbon rod), which can be burned and oxidized at a low temperature, is used as an anode for arc-discharge. Thus, the inventors have made the present invention.

According to the present invention, there is provided a method for producing a carbon nanotube which comprises the steps of: producing soot containing a carbon nanotube by arc-discharge using an anode which contains amorphous carbon as a main component; and purifying the produced soot. In this method for producing a carbon nanotube, the anode containing amorphous carbon as the main component preferably contains 50 wt % or more of amorphous carbon, and preferably contains a metal catalyst. The anode containing amorphous carbon as the main component is preferably an anode produced by filling a metal catalyst in a hole formed in an amorphous carbon rod which is obtained by burning a mixture of carbon black and coal-tar pitch. Moreover, the metal catalyst is preferably a mixed powder containing Fe, Ni and S.

The purifying step preferably includes: a first burning and oxidizing step of heating the soot at a temperature of not lower than 350° C. in the atmosphere to burn and oxidize the soot; a first acid treatment step of immersing soot, which is obtained at the first burning and oxidizing step, in an acid; a second burning and oxidizing step of heating soot, which is obtained at the first acid treatment step, at a temperature, which is not lower than the heating temperature at the first burning and oxidizing step and which is not lower than 500° C., to burn and oxidize the soot; a second acid treatment step of immersing soot, which is obtained at the second burning and oxidizing step, in an acid; and a heating step under vacuum of heating soot, which is obtained at the second acid treatment step, in vacuum. Preferably, the heating temperature at the heating step under vacuum is not lower than 1000° C. The carbon nanotube is preferably a single-walled carbon nanotube.

According to the present invention, there is provided a carbon nanotube wherein a ratio (G/D ratio) of a spectrum intensity of G-band, which is an intrinsic Raman band of the carbon nanotube, to a spectrum intensity of D-band, which is derived from amorphous carbon, is in the range of from 85 to 115 in Raman scattering spectrometry. The carbon nanotube preferably has a peak having a half-value width of not greater than 1.0 k at a temperature of 19.0 to 22.0 K in a thermal desorption spectrum which is measured by raising the temperature of the carbon nanotube at a rate of temperature rise of 0.2 K/s after $H_2$ or $D_2$ gas serving as an adsorbed gas is sprayed and adsorbed onto the carbon nanotube. Preferably, in the carbon nanotube, the number of defects having a size of about 1 nm is not greater than 10 in a 100 nm square of an image of a transmission electron microscopy (TEM). The carbon nanotube is preferably a single-walled carbon nanotube.

According to the present invention, there is provided an anode used for producing a single-walled carbon nanotube, wherein the anode contains amorphous carbon as a main component. The anode preferably contains 50 wt % or more of amorphous carbon, and preferably contains a metal catalyst. The anode is preferably produced by filling a metal catalyst in a hole formed in an amorphous carbon rod which is obtained by burning a mixture of carbon black and coal-tar pitch.

According to the present invention, it is possible to produce a high-purity carbon nanotube with simple purification by causing graphite to be hardly contained in crude soot obtained immediately after being synthesized by arc-discharge.

BEST MODE FOR CARRYING OUT THE INVENTION

[Production of Carbon Nanotubes]

Figure 1:
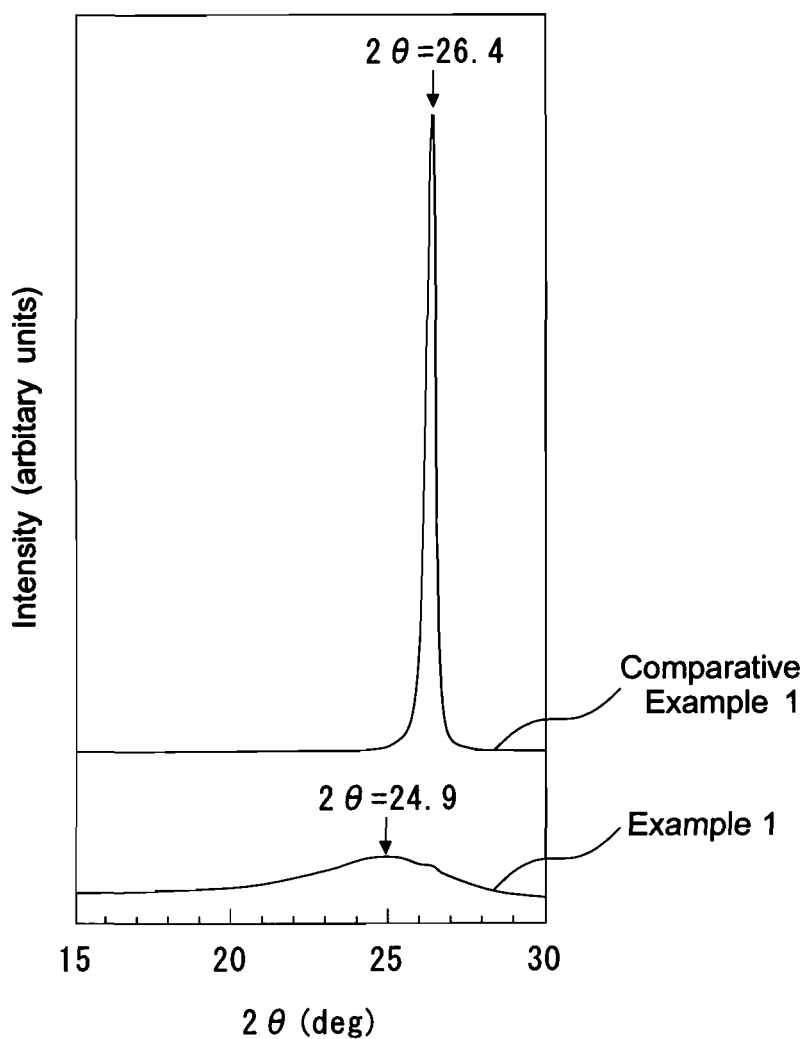
FIG. 1 is a chart showing the results of measurements of X-ray diffraction of an amorphous carbon rod, which was used as an anode in Example 1, and a graphite rod which was used as an anode in Comparative Example 1.

In a preferred embodiment of a method for producing a carbon nanotube according to the present invention, an anode containing amorphous carbon as a main component is used for carrying out arc-discharge in a method for producing a carbon nanotube (or a bundle of carbon nanotubes) by purifying soot containing carbon nanotubes produced by arc-discharge. For example, a preferred embodiment of a method for producing a carbon nanotube according to the present invention comprises: a step of preparing an anode containing amorphous carbon as a main component; a step of producing soot containing single-walled carbon nanotubes by arc-discharge using the anode; a first burning and oxidizing step of heating the produced soot containing single-walled carbon nanotubes at a temperature of not lower than 350° C. in the atmosphere to burn and oxidize the produced soot; a first acid treatment step of immersing soot, which is obtained at the first burning and oxidizing step, in an acid; a second burning and oxidizing step of heating soot, which is obtained at the first acid treatment step, at a temperature, which is not lower than the heating temperature at the first burning and oxidizing step and which is not lower than 500° C., in the atmosphere to burn and oxidize the soot; and a second acid treatment step of immersing soot, which is obtained at the second burning and oxidizing step, in an acid. The method may further comprise a heating step under vacuum of heating soot, which is obtained at the second acid treatment step, in vacuum. These steps will be described below in detail.

(Anode Preparing Step)

After coal-tar pitch is added to carbon black to be mixed therewith to increase the hardness thereof to the hardness of clay, stiffening (manipulation for sufficiently mixing them in a hard cake state) is carried out to apply shearing force to the mixture to sufficiently mix them. After the stiffening is completed, the mixture is filled in a disk-shaped mold to be molded by applying a predetermined pressure (e.g., 50 kg/cm$^2$) thereto at a predetermined temperature (e.g., 130° C.). After the mold is removed, the molded mixture is heated under an atmosphere of nitrogen to be burned, and then, the mixture is slowly cooled to prepare a disk. From the disk, an amorphous carbon rod (a lowly graphitized carbon rod) is prepared. At the center of the amorphous carbon rod, a hole is formed to be filled with a metal catalyst of the mixed powder of Fe, Ni and S (mass ratio=10:10:1) or C, Fe, Ni, S and CFx (mass ratio=30:10:10:1:1) to prepare an anode.

Although the amorphous carbon rod used as the anode is preferably a carbon rod substantially consisting of amorphous carbon, it may contain impurities and crystalline carbon if it is a carbon rod containing amorphous carbon as a main component and preferably containing 50 wt % or more of amorphous carbon.

(Carbon Nanotube Producing Step)

First, soot containing carbon nanotubes is produced by arc-discharge. As a pair of electrodes mounted in the chamber of an arc-discharge device, the above-described anode and a cathode of a graphite rod are used. Furthermore, in the arc-discharge method, the temperature between electrodes reaches several thousands ° C. during discharge to vaporize carbon of the cathode in the high-temperature plasma, and the vaporized carbon is cooled with an inert gas in the chamber to aggregate, so that soot is deposited in the chamber. Single-walled carbon nanotubes are mainly contained in soot deposited on the top plate of the chamber, on the upper portion of the inner wall thereof and on the cathode. Multi-walled carbon nanotubes are mainly contained in the black soft portion in the deposit on the cathode.

(First Burning and Oxidizing Step)

Then, the soot containing single-walled carbon nanotubes deposited on the upper portion of the inner wall and the cathode is collected. Since the soot thus collected contains impurities, such as graphite capsule containing amorphous carbon and metals, in addition to single-walled carbon nanotubes, the collected soot is heated at a temperature of not lower than 350° C., preferably at a temperature of 350 to 550° C., more preferably at a temperature of 450 to 550° C., and most preferably at a temperature of 550° C., in the atmosphere to burn and remove the impurities. Thus, it is possible to burn and remove amorphous carbon other than single-walled carbon nanotubes. Although the collected soot also contains fullerene and metal catalyst containing fullerene, it is possible to break the fullerene by the above-described heating. Furthermore, at the first burning and oxidizing step, after the collected soot is heated in the atmosphere, it may be heated at a temperature higher than the heating temperature.

(First Acid Treatment Step)

After the soot thus heated is immersed in an acid, such as hydrochloric acid, sulfuric acid, nitric acid or oxalic acid, to be left to stand at a room temperature, the soot is collected by filtration, washed with distilled water and dried, so that it is possible to remove the metal catalyst remaining in the soot.

(Second Burning and Oxidizing Step)

The soot thus obtained is heated at a temperature of not lower than 500° C., preferably at a temperature of 500 to 600° C., more preferably at a temperature of 540 to 560° C., and most preferably at a temperature of 550° C., in the atmosphere to burn and remove impurities. Thus, it is possible to burn and remove graphite capsule other than single-walled carbon nanotubes.

(Second Acid Treatment Step)

After the soot thus heated is immersed in hydrochloric acid to be left to stand at a room temperature, the soot is collected by filtration, washed with distilled water and dried, so that it is possible to remove the metal catalyst remaining the soot.

(Heating Step Under Vacuum)

The single-walled carbon nanotubes thus purified after being synthesized are heated at a temperature of not lower than 1000° C., preferably at a temperature of 1000 to 1500° C., more preferably at a temperature of 1100 to 1300° C., and most preferably at a temperature of 1200° C. in vacuum, so that it is possible to recondition the defects of the single-walled carbon nanotubes (the defects caused in the single-walled carbon nanotubes by oxidation).

[Evaluation of Carbon Nanotubes]

(Evaluation based on Raman Scattering Spectrometry)

In general, if light enters a material, part of the light is inelastically scattered. The scattered light contains light $v_0$ having the same wave number as that of incident light (excitation light) as well as a very small amount of light having a wave number $v_0 \pm V_R$ different from that of incident light. This phenomenon is called Raman Effect, and the scattering based on interaction with excitation light, molecular vibration, phonon of solid, and other elementary excitation is called Raman scattering. The deviation $v_R$ of the wave number shifted from that of the caused excitation light is called Raman shift, which is an inherent value for each material. Therefore, if Raman scattering is measured, it is possible to examine the state of elementary excitation in the material. In addition, if Raman scattering is measured while changing temperature and pressure, it is possible to examine the variation of the state in the material on the basis of the variations in scattering strength, the variation in shift of the peak position, and so forth.

If the Raman scatting spectrometry is used for evaluating carbon nanotubes, the lattice vibration of carbon nanotubes is basically the vibration of graphite, but the peculiar periodicity of carbon nanotubes causes new effects. For example, if a graphene sheet is cylindrically wound to form a seamless tube, a vibration mode called bleeding mode appears. Since it is known that the frequency of the vibration mode is in inverse proportion to the diameter of the tube, it is possible to know the distribution of the diameter of the tube if the frequency of the bleeding mode is measured by Raman scattering.

The ratio (G/D ratio) of the spectrum intensity of G-band, which is the intrinsic Raman band of carbon nanotubes, to the spectrum intensity of D-band, which is derived from amorphous carbon, can be used as an index indicating the purity of the synthesized single-walled carbon nanotubes (the measure indicating the degree of inclusion of impurities).

(Evaluation Based on TEM Image)

From the TEM image of the single-walled carbon nanotubes, it can be verified whether the single-walled carbon nanotubes form bundle(s) and whether defects are caused on the wall surfaces of the single-walled carbon nanotubes.

(Evaluation Based on Thermal Desorption Method)

An apparatus, which has a quadrupole mass spectrometer for measuring thermal desorption spectra and a gas dozer having a gas exposing orifice (pore) for spraying a gas onto a sample, is used for spraying and adsorbing $H_2$ or $D_2$ gas as an adsorbed gas onto the sample of single-walled carbon nanotubes and for raising the temperature of the gas sprayed sample of single-walled carbon nanotubes to measure the thermal desorption spectra (TDS). Thus, it is possible to determine the presence of defects of the single-walled carbon nanotubes on the basis of the peak temperature and peak shape of the thermal desorption spectra.

Furthermore, in order to measure the thermal desorption spectra of the sample of single-walled carbon nanotubes, it is required to fix the powdered sample of single-walled carbon nanotubes to a metal substrate. For example, the sample can be fixed to a metal substrate by dispersing soot containing single-walled carbon nanotubes in a solvent, such as ethanol, with ultrasonic waves, spraying the soot dispersed solvent onto the metal substrate with an air brush or the like, and then, drying the soot dispersed solvent with a dryer while preventing the solvent from dropping. Alternatively, the carbon nanotubes may be formed as a sheet or film to be fixed to a metal substrate.

If single-walled carbon nanotubes are produced by the above-described preferred embodiment of a method for producing a carbon nanotube according to the present invention, a peak having a half-value width of not greater than 1.0 K appears at a temperature of 19.0 to 22.0 K in a thermal desorption spectra which are measured by raising the temperature of the single-walled carbon nanotubes at a rate of temperature rise of 0.2 K/s after $H_2$ or $D_2$ gas serving as an adsorbed gas is sprayed and adsorbed onto the single-walled carbon nanotubes. It can be evaluated that the single-walled carbon nanotubes have no defects or hardly have defects since the lattice fringe image of the single-walled carbon nanotubes is clearly observed in the image of a transmission electron microscopy (TEM), e.g., only ten or less of defects having a size of about 1 nm are observed within a 100 nm square in the TEM image. On the other hand, it can be evaluated that single-walled carbon nanotubes, which do not have such a peak, contain many lattice defects.

Examples of a carbon nanotube and a method for producing the same according to the present invention will be described below in detail.

EXAMPLE 1

First, 40 wt % of coal-tar pitch was added to 60 wt % of carbon black ("SEAST TA" produced by Tokai Carbon Co., Ltd.) to be mixed therewith. After the hardness of the mixture was increased to the hardness of clay, stiffening (manipulation for sufficiently mixing them in a hard cake state) was carried out for three hours to apply shearing force to the mixture to sufficiently mix them. After the stiffening was completed, the mixture was filled in a disk-shaped mold (diameter: about 100 mm, thickness: 20 mm) to be molded by applying a pressure of 50 kg/cm² thereto at 130° C. for three minutes. Then, after the mold is removed, the molded mixture was heated to a temperature of 1000° C. at a rate of temperature rise of 5° C./min under an atmosphere of nitrogen to be left to stand at the temperature for two hours to be burned, and then, the mixture was slowly cooled to prepare a disk having a diameter of 100 mm and a thickness of 20 mm. From the disk, a square bar (a lowly graphitized carbon rod (an amorphous carbon rod)) having a size of 6 mm×6 mm×70 mm was prepared. At the center of the amorphous carbon rod, a hole having a diameter of 3.2 mm and a depth of 50 mm was formed to be filled with a metal catalyst of the mixed powder of Fe, Ni and S (mass ratio=10:10:1) to prepare an anode.

Then, the prepared anode and a graphite rod (purity: 99.9%) having a diameter of 16 mm were used as a pair of electrodes, which were mounted in the chamber of an arc-discharge device, for synthesizing single-walled carbon nanotubes by the arc-discharge method as follows.

First, the above-described pair of electrodes were mounted in the chamber of an arc-discharge device. Then, after the interior of the chamber was evacuated by means of a rotary pump so as to have a pressure of $10^{-2}$ Torr, a direct current of 70 A was caused to flow through the anode and cathode contacting therewith. Thus, baking was carried out for five minutes to burn the filled metal catalyst powder and to decompose hydrogen carbides. Then, after the interior of the chamber was cooled for 30 minutes, helium gas was filled in the interior of the chamber until the pressure therein reaches 100 Torr, and then, the interior of the chamber was evacuated so as to have a pressure of $10^{-2}$ Torr again. Thereafter, helium gas was filled in the interior of the chamber until the pressure therein reaches 100 Torr, and arc-discharge was carried out at a current of 90 A for five minutes while the distance between the electrodes was held to be 3 mm. Furthermore, the arc-discharge time was adjusted in accordance with the length of the carbon rod of the anode, and the current value in the arc-discharge was adjusted so that the arc current density (arc current value per unit cross section of the anode) was 2.5 A/mm². After the arc-discharge was completed, the chamber was cooled for 30 minutes. Then, soot deposited on the top plate of the chamber and on the upper portion of the inner wall thereof was collected, and soot deposited on the cathode was collected.

Since the soot thus collected contained impurities in addition to single-walled carbon nanotubes, the impurities were removed as follows.

First, in order to burn and remove amorphous carbon other than single-walled carbon nanotubes, the collected soot was heated at 450° C. for 30 minutes in the atmosphere to be burned and oxidized, and continuously, heated at 500° C., for 30 minutes in the atmosphere to be burned and oxidized. Then, after the soot thus heated was immersed in 6N hydrochloric acid to be left to stand at 60° C., for 12 hours or more, the soot was collected by filtration and dried at 60° C. for 12 hours or more. The soot thus dried was heated (annealed) at 1200° C. for 3 hours in vacuum of $10^{-7}$ Torr to obtain single-walled carbon nanotubes.

COMPARATIVE EXAMPLE 1

Single-walled carbon nanotubes were synthesized and purified by the same method as that in the above-described Example 1, except that a graphite rod (purity: 99.9%) having a diameter of 6 mm and a length 100 mm and having a hole at the center thereof, the hole having a diameter of 3.2 mm and a depth of 85 mm, was substituted for the amorphous carbon rod.

(Evaluation of Carbon Rod Used as Anode in Example 1 and Comparative Example 1)

FIG. 1 shows the X-ray diffraction (XRD) profile of the amorphous carbon rod used as the anode in Example 1, and the XRD profile of the graphite rod used as the anode in Comparative Example 1.

In graphite, such as natural graphite or HOPG (Highly Oriented Pyrolytic Graphite), the spacing between lattice planes in the direction of C-axis, i.e., the spacing between (002) planes, is 0.335 nm, and a peak appears at 2θ=26.4° in the XRD profile. In addition, crystallite develops over a long period, so that the intensity of diffraction is also large. Therefore, in the XRD profile of the graphite rod used as the anode in Comparative Example 1, a peak having a high intensity of diffraction appears at 2θ=26.4° as shown in FIG. 1.

On the other hand, in the XRD profile of the amorphous carbon rod used as the anode in Example 1, a broad peak having a low intensity of diffraction appears at 2θ=24.9° as shown in FIG. 1. It can be seen from this result that the carbon rod used as the anode in Example 1 is a lowly graphitized carbon rod, which does not have the structure of regular layers and which has the structure of randomized layers, since the spacing between (002) planes is 0.357 nm which is far greater than that of graphite and since the intensity of diffraction is low.

Figure 2:
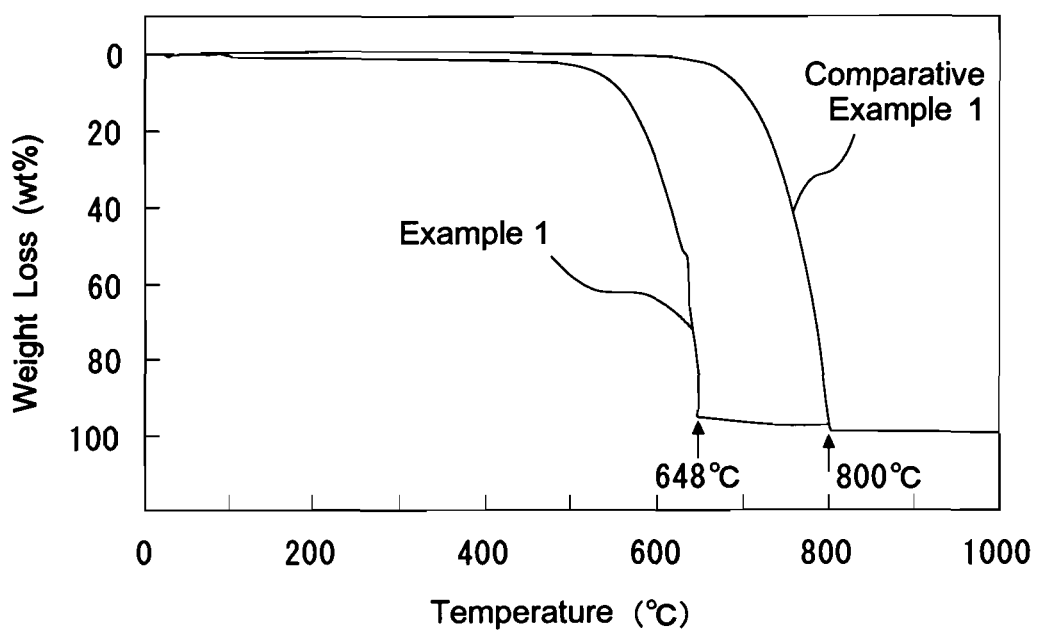
FIG. 2 is a chart showing weight loss percentage curves when the temperatures of the amorphous carbon rod, which was used as the anode in Example 1, and the graphite rod, which was used as the anode in Comparative Example 1, were increased at a rate of temperature rise of 5° C./min in the atmosphere.

FIG. 2 shows weight loss percentage curves when the temperatures of the amorphous carbon rod, which was used as the anode in Example 1, and the graphite rod, which was used as the anode in Comparative Example 1, were increased at a rate of temperature rise of 5° C./min in the atmosphere.

Since CO and $CO_2$ are generated if carbon materials react with oxygen, the temperatures at which carbon materials react with oxygen can be evaluated by the thermogravimetric analysis of carbon materials in the atmosphere. In general, the oxidation starting temperature is 700° C. in the case of graphite, whereas the oxidation starting temperature is in the range of from 400 to 600° C. in the case of lowly graphitized carbon materials although it depends on the graphitized degree. The reason why the oxidation starting temperature is thus decreased in lowly graphitized carbon materials is that such carbon materials have thermally unstable structures since a larger number of edges of graphine, the edges of which are reaction sites with oxygen and which is a size of a few nanometer, are exposed in the structure of randomized layers, which is not the graphite structure. As shown in FIG. 2, it can be verified that the weight of the graphite rod used as the anode in Comparative Example 1 starts to decrease at about 700° C., and the weight of the amorphous carbon rod used as the anode in Example 1 starts to decrease at about 500° C. It can be seen from these results that the carbon rod used as the anode in Example 1 is a lowly graphitized carbon rod which does not have the structure of regular layers and which has the structure of randomized layers.

(Evaluation of Single-Walled Carbon Nanotubes Produced in Example 1 and Comparative Example 1)

Figure 3:
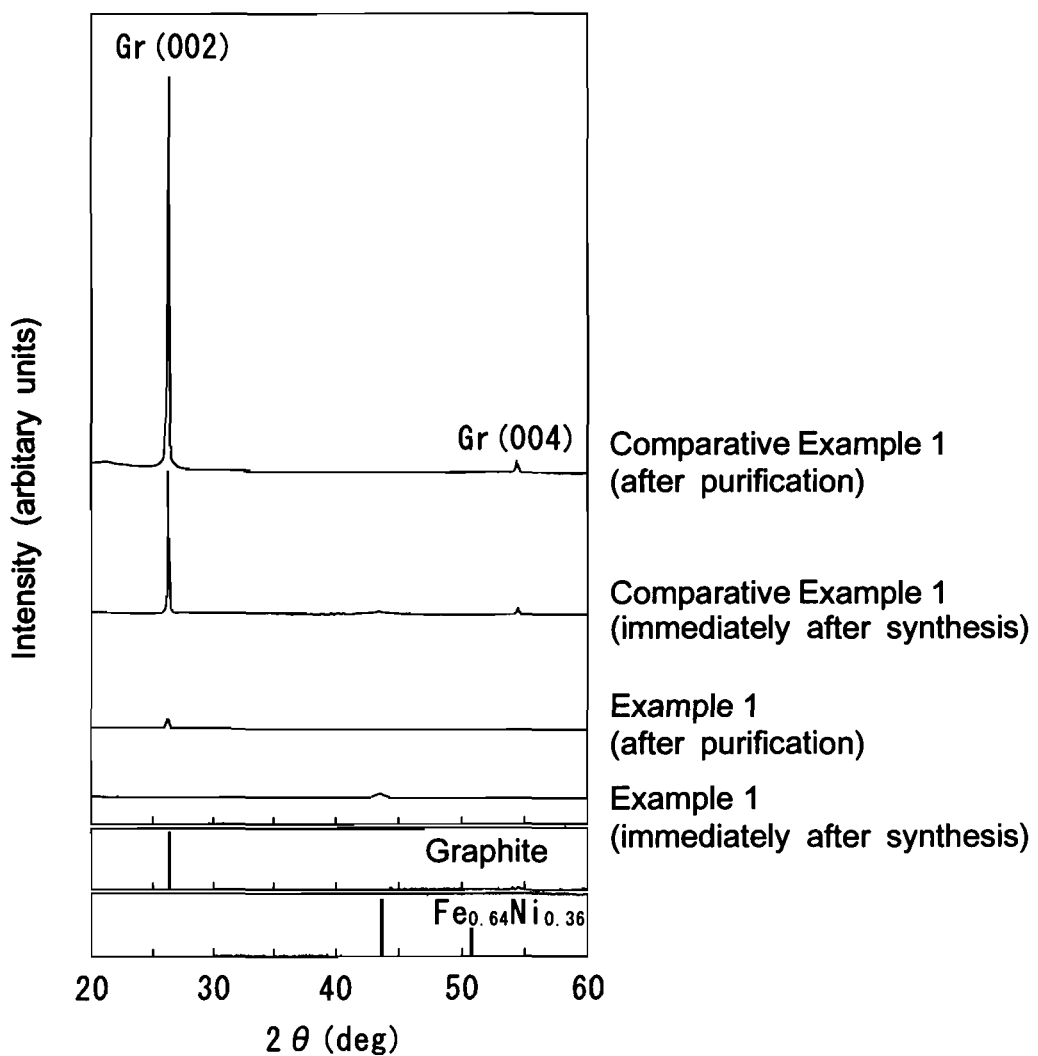
FIG. 3 is a chart showing the X-ray diffraction (XRD) profiles of single-walled carbon nanotubes which were obtained immediately after synthesis and after purification with respect to single-walled carbon nanotubes produced by using the amorphous carbon rod as the anode in Example 1, and the XRD profiles of single-walled carbon nanotubes which were obtained immediately after synthesis and after purification with respect to single-walled carbon nanotubes produced by using the graphite rod as the anode in Comparative Example 1.
Figure 4A:
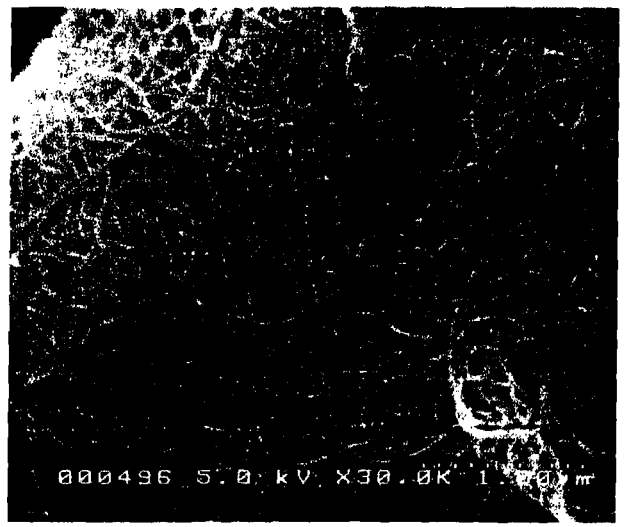
FIG. 4A is a scanning electron microphotograph (SEM image) (×30,000) of purified single-walled carbon nanotubes obtained by purifying single-walled carbon nanotubes produced by using the amorphous carbon rod as the anode in Example 1.
Figure 4B:
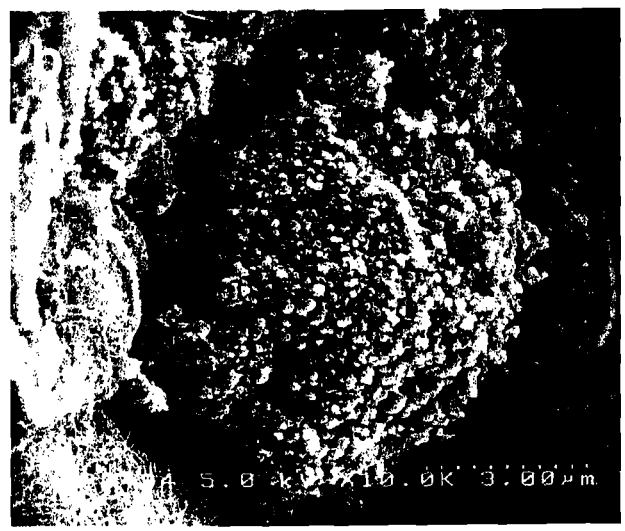
FIG. 4B is a SEM image (×10,000) showing an impurity portion of the purified single-walled carbon nanotubes of FIG. 4A.
Figure 5A:
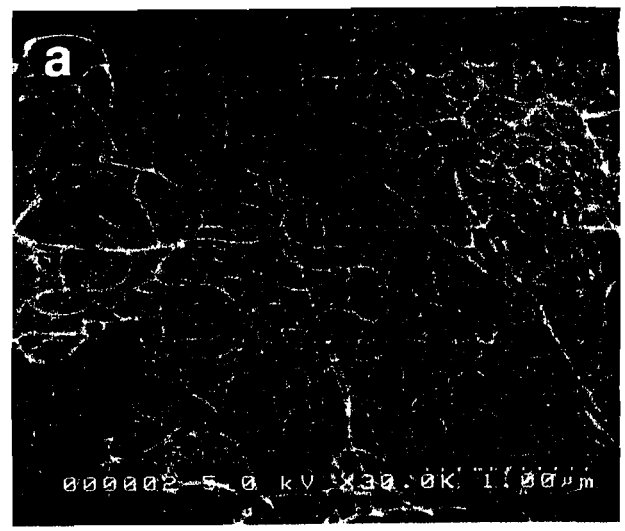
FIG. 5A is a SEM image (×30,000) of purified single-walled carbon nanotubes obtained by purifying single-walled carbon nanotubes produced by using the graphite rod as the anode in Comparative Example 1.
Figure 5B:
FIG. 5B is a SEM image (×1,000) showing a graphite portion of the purified single-walled carbon nanotubes of FIG. 5A.

FIG. 3 shows the X-ray diffraction (XRD) profiles of single-walled carbon nanotubes which were obtained immediately after synthesis and after purification with respect to the single-walled carbon nanotubes produced by using the amorphous carbon rod as the anode in Example 1, and the XRD profiles of single-walled carbon nanotubes which were obtained immediately after synthesis and after purification with respect to the single-walled carbon nanotubes produced by using the graphite rod as the anode in Comparative Example 1. FIGS. 4A and 4B show the scanning electron microphotographs (SEM image) of the purified single-walled carbon nanotubes obtained by purifying single-walled carbon nanotubes produced by using the amorphous carbon rod as the anode in Example 1. FIGS. 5A and 5B show the SEM images of the purified single-walled carbon nanotubes obtained by purifying single-walled carbon nanotubes produced by using the graphite rod as the anode in Comparative Example 1.

As shown in FIG. 3, peaks having high intensities of diffraction appear at 2θ=26.4° in the XRD profiles of single-walled carbon nanotubes which were obtained immediately after synthesis and after purification with respect to the single-walled carbon nanotubes produced in Comparative Example 1, so that it can be clearly seen that the produced single-walled carbon nanotubes contain graphite. Furthermore, the reason why the intensity of the peak for graphite is increased after purification is that, although the purity of carbon nanotubes increases, the concentration of graphite per unit volume increases since graphite remains without being oxidized even if it is burned at 500° C. in the atmosphere. After the purified single-walled carbon nanotubes obtained by purifying the single-walled carbon nanotubes produced in Comparative Example 1 were observed by means of the scanning electron microscope (SEM), single-walled carbon nanotubes were observed as shown in FIG. 5A, and a large lump of graphite having a size of 10 to 30 μm was also observed as shown in FIG. 5B. It is considered that the strong peak for graphite in the XRD profile is caused by the lump of graphite. It is also considered that such a lump of graphite is produced by dispersing graphite in soot by sputtering based on arc-discharge without sublimating the graphite rod used as the anode during arc-discharge.

On the other hand, as shown in FIG. 3, the peak for graphite (the peak at 2θ=26.4°) does not appear in the X-ray diffraction (XRD) profiles of the single-walled carbon nanotubes which were obtained immediately after synthesis and after purification with respect to the single-walled carbon nanotubes produced in Example 1. Furthermore, a peak having a very low intensity for graphite appears at 2θ=26.38° in the XRD profile of the single-walled carbon nanotubes after purification. It is assumed that this peak is not derived from the amorphous carbon rod (the peak derived from the amorphous carbon rod appears at 2θ=24.9° as shown in FIG. 1) and is derived from a very small amount of graphite, such as graphite capsule (for covering the metal catalyst) produced by arc-discharge. It can be seen that the peaks for Fe/Ni alloy (the peaks near 2θ=43.6° and the peak near 2θ=50.8°) appearing in the XRD profile of the single-walled carbon nanotubes immediately after synthesis are not observed in the XRD profile of the single-walled carbon nanotubes after purification, so that the metal catalyst was removed by purification). After the single-walled carbon nanotubes produced and purified in Example 1 were observed by means of the scanning electron microscope (SEM), the single-walled carbon nanotubes were uniformly observed as shown in FIG. 4A. In addition, aggregates having a size of 1 to 3 μm formed by agglutinating nanoparticles having a size of a few nanometers, which are considered as graphite capsule for covering the metal catalyst, were observed in a very small area.

Each of the intensities of the peaks of graphite on the (002) plane in the X-ray diffraction (XRD) profile was measured twice per unit mass of the single-walled carbon nanotubes immediately after synthesis and after purification with respect to the single-walled carbon nanotubes produced by using the amorphous carbon rod as the anode in Example 1. As a result, the intensities of the peaks of graphite on the (002) plane in the X-ray diffraction (XRD) profile per unit mass of the single-walled carbon nanotubes immediately after synthesis and after purification were 2.6 cps/mg and 215 cps/gm, respectively, in the first measurement, and 0 cps/mg and 80 cps/gm, respectively, in the second measurement. Each of the intensities of the peaks of graphite on the (002) plane in the X-ray diffraction (XRD) profile was measured twice per unit mass of the single-walled carbon nanotubes immediately after synthesis and after purification with respect to the single-walled carbon nanotubes produced in Comparative Example 1. As a result, the intensities of the peaks of graphite on the (002) plane in the X-ray diffraction (XRD) profile per unit mass of the single-walled carbon nanotubes immediately after synthesis and after purification were 400 cps/mg and 2062.7 cps/gm, respectively, in the first measurement, and 538.8 cps/mg and 2306.4 cps/gm, respectively, in the second measurement. Furthermore, the unit "cps" means "counts per second". These results are shown in Table 1.

TABLE 1

|  | Comparative Example 1 | Example 1 |
|---|---|---|
| Immediately After Synthesis | 400-583.8 (cps/mg) | 0-2.6 (cps/mg) |
| After Purification | 2062.7-2306.4 (cps/mg) | 80-215 (cps/mg) |

As can be seen from Table 1, the amount of graphite contained in the single-walled carbon nanotubes immediately after synthesis and after purification with respect to the single-walled carbon nanotubes produced by using the amorphous carbon rod as the anode in Example 1 is far smaller than the amount of graphite contained in the single-walled carbon nanotubes immediately after synthesis and after purification with respect to the single-walled carbon nanotubes produced in Comparative Example 1.

The Raman scattering spectrometry of the single-walled carbon nanotubes immediately after synthesis and after purification with respect to the single-walled carbon nanotubes produced by using the amorphous carbon rod as the anode in Example 1 was carried out twice. As a result, the ratios (G/D) of the intensities of Raman spectra of single-walled carbon nanotubes immediately after synthesis and after purification were 23.5 and 85.0, respectively, in the first Raman scattering spectrometry, and 40.1 and 100, respectively, in the second Raman scattering spectrometry. The Raman scattering spectrometry of the single-walled carbon nanotubes immediately after synthesis and after purification with respect to the single-walled carbon nanotubes produced in Comparative Example 1 was carried out twice. As a result, the ratios (G/D) of the intensities of Raman spectra of the single-walled carbon nanotubes immediately after synthesis and after purification were 34.5 and 76.0, respectively, in the first Raman scattering spectrometry, and 52.6 and 80.0, respectively, in the second Raman scattering spectrometry. These results are shown in Table 2.

TABLE 2

|  | Comparative Example 1 | Example 1 |
|---|---|---|
| Immediately After Synthesis | 34.5-52.6 | 23.5-40.0 |
| After Purification | 76.0-80.0 | 85.0-100 |

As can be seen from Table 2, the ratios (G/D) of the intensities of Raman spectra of the single-walled carbon nanotubes after purification with respect to the single-walled carbon nanotubes produced by using the amorphous carbon rod as the anode in Example 1 are in the very high range of from 85 to 100, so that the purity of the single-walled carbon nanotubes is very high. This means that the amount of impurities was greatly decreased to greatly increase the purity of the single-walled carbon nanotubes in accordance with the greatly decreased amount of graphite per unit volume.

After the samples of single-walled carbon nanotubes obtained in Example 1 and Comparative Example 1 were observed, the length of the samples (the length of the carbon nanotubes) was about 1 to 3 µm, and the samples were so-called highway junction type single-walled carbon nanotubes, the overall length of which was relatively long. In the TEM image of the single-walled carbon nanotubes obtained in Example 1, the bundles of single-walled carbon nanotubes were formed, and the wall surface of each of the single-walled carbon nanotubes was clearly verified. It can be seen from the TEM image that the single-walled carbon nanotubes obtained in Example 1 have no defects or hardly have defects.

An apparatus, which has a quadrupole mass spectrometer for measuring thermal desorption spectra and a gas dozer having a gas exposing orifice (pore) having a diameter of 20 µm for spraying a gas onto the sample fixed to the metal substrate, was used for spraying and adsorbing $H_2$ or $D_2$ gas as an adsorbed gas onto the sample of single-walled carbon nanotubes obtained in Example 1 while the temperature of the sample is held at 13K. Then, the apparatus was used for raising the temperature of the gas sprayed sample to measure the thermal desorption spectra by raising the temperature of the sample at a rate of temperature rise of 0.2 K/s.

Furthermore, in order to fix the powdered sample of single-walled carbon nanotubes to the metal substrate, 10 mg of soot containing single-walled carbon nanotubes obtained in Example 1 was added to 100 cc of ethanol to be dispersed for 60 minutes with ultrasonic waves (200 W, 39 kHz) to be sprayed onto a copper substrate having a size of 1 cm$^2$ fixed to a silver pad with an air brush, and then, dried with a dryer while preventing the soot dispersed ethanol from dropping.

Figure 6:
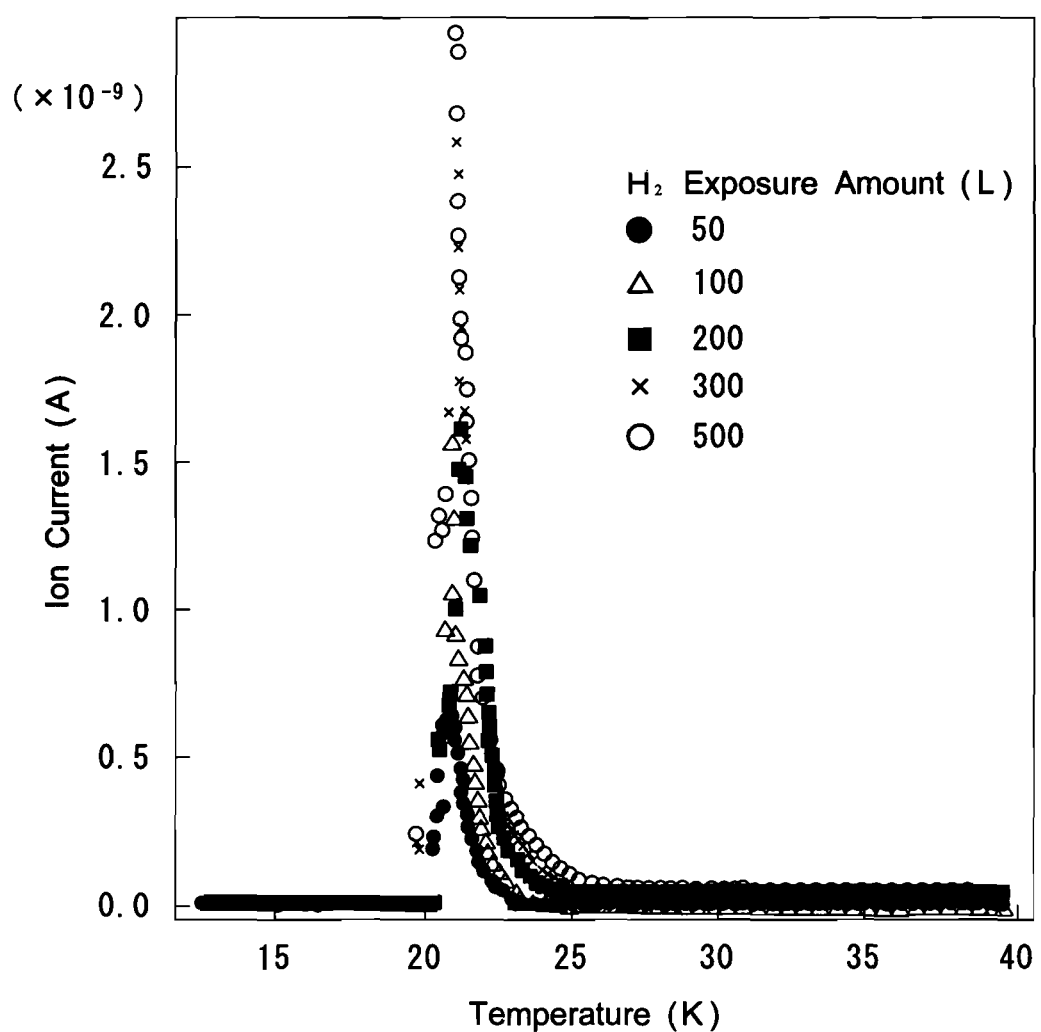
FIG. 6 is a chart showing thermal desorption spectra after $H_2$ is exposed to the sample of the single-walled carbon nanotubes produced in Example 1.

As shown in FIG. 6, in the thermal desorption spectra after the samples of single-walled carbon nanotubes of Example 1 were exposed to 50 L, 100 L, 200 L, 300 L and 500 L of $H_2$, respectively, sharp peaks were observed at a sample temperature of 20.5K in the exposure amount of 300 to 500 L, and the half-value width was 0.9K in the exposure amounts of 300 L and 500 L. In the thermal desorption spectra after the samples of single-walled carbon nanotubes of Example 1 were exposed to 50 L, 100 L, 300 L, 500 L, 700 L and 1000 L of $D_2$, respectively, sharp peaks were observed at a sample temperature of 20.3K in the exposure amount of 300 to 1000 L, and the half-value width was 0.9K in the exposure amounts of 700 L and 1000 L.

Furthermore, the yield of the purified single-walled carbon nanotubes obtained by purifying single-walled carbon nanotubes produced by using the amorphous carbon rod as the anode in Example 1 was 5 to 10 wt % with respect to the single-walled carbon nanotubes immediately after synthesis, and the purity of the purified single-walled carbon nanotubes was not less than 99% (metal: 0.5 wt % or less, carbon nanocapsule: 0.5 wt % or less).

COMPARATIVE EXAMPLE 2

First, 30 wt % of coal-tar pitch (binder) having a softening point of 98° C. and 58% of fixed carbon was added to graded petroleum needle coke to be sufficiently mixed at 140° C. with a Werner mixer to prepare a uniform paste. The paste thus prepared was filled in the container of an extrusion molding machine, and then, a shaft core mandrel was mounted on a cylindrical nozzle of the machine to prepare an molded article at an extrusion pressure of not less than 40 kg/cm$^2$. After the molded article was burned and carbonized at 1000° C. in a kiln, it was arranged in an LWG furnace to be graphitized at 3000° C. to obtain a rod (graphite rod) having a diameter of 6 mm and a length of 100 mm and having a hole at the center thereof, the hole having a diameter of 3.2 mm and a depth of 70 mm.

Then, iron powder (100 meth iron powder produced by Wako Pure Chemical Industries, Ltd.), nickel powder (100 mesh nickel powder produced by Wako Pure Chemical Industries, Ltd.), sulfur (High Purity 5-N Grade produced by Mitsuwa Chemical Co., Ltd.) and CFx (Poly(carbon monofluoride)) (produced by Daikin Industries, Ltd.) were mixed in a mortar to prepare a metal catalyst of a mixed powder of C, Fe, Ni, S and CFx (mass ratio=30:10:10:1:1). The metal catalyst thus prepared was filled in the hole of the graphite rod to prepare an anode.

Then, the prepared anode and a cathode of a graphite rod (purity 99.9%) having a diameter of 16 mm were used as a pair of electrodes, which were mounted in the chamber of an arc-discharge device, for synthesizing single-walled carbon nanotubes by the arc-discharge method as follows.

First, the above-described pair of electrodes were mounted in the chamber of the arc-discharge device. Then, after the interior of the chamber was evacuated by means of a rotary pump so as to have a pressure of $10^{-2}$ Torr, currents of 28.6 A (current density: 1.01 A/mm$^2$), 37.9 A (current density: 1.34 A/mm$^2$), 47.5 A (current density: 1.68 A/mm$^2$), 56.8 A (current density: 2.01 A/mm$^2$) and 66.4 A (current density: 2.35 A/mm$^2$) were caused to flow through the anode and cathode contacting therewith, for 3 minutes, 3 minutes, 3 minutes, 3 minutes and 5 minutes, respectively, to carry out annealing. Furthermore, the current density means a current value per unit cross section of the anode, and is a value obtained by dividing a current value by 28.26 mm$^2$ being the cross section of the rod.

Then, helium gas was filled in the interior of the chamber until the pressure therein reached 100 Torr, and arc-discharge was carried out at a current of 75.8 A (current density: 2.68 A/mm$^2$) while the distance between the electrodes was held to be 3 mm. The arc-discharge was completed when the anode was consumed to some extent. After the arc-discharge was completed, soot deposited on the top plate of the chamber and the inner surface of the side wall thereof was collected.

Since the soot thus collected contained impurities in addition to single-walled carbon nanotubes, the impurities were removed as follows.

First, in order to burn and remove amorphous carbon other than single-walled carbon nanotubes, the collected soot was put in a permeable SUS container to be mounted in a muffle furnace (FM37 produced by Yamato Scientific Co., Ltd.) to be heated at 450° C. for 30 minutes in the atmosphere to be burned and oxidized, and continuously, heated at 500° C. for 30 minutes in the atmosphere to be burned and oxidized. Then, after the soot thus burned and oxidized was put in a bottle having a screw cap to be immersed in 100 mL of 6N hydrochloric acid solution (a solution prepared by mixing 35.0 to 37.0 wt % of hydrochloric acid (reagent chemicals produced by Wako Pure Chemical Industries, Ltd.) with purified water at a capacity ratio of 1:1) to be left to stand at 60° C. for a whole day and night (primary treatment), a membrane filter (PTFE T300A047A produced by ADVANTEC Co., Ltd.) was used for filtering and washing the solution with purified water until the waste liquid was not acidic. The soot thus washed was dried at 60° C. in the atmosphere for a whole day and night. The soot thus dried was heated at 500° C. in the atmosphere for 30 minutes to be burned and oxidized. After the soot thus burned and oxidized was immersed in the same hydrochloric acid solution as the above-described 6N hydrochloric acid solution to be left to stand at 60° C. for a whole day and night (secondary treatment), the same membrane filter as the above-described membrane filter was used for filtering and washing the solution with purified water until the waste liquid was not acidic. The soot thus washed was dried at 60° C. in the atmosphere for a whole day and night to prepare purified single-walled carbon nanotubes.

EXAMPLE 2

First, 40 wt % of coal-tar pitch was added to 60 wt % of carbon black ("SEAST TA" produced by Tokai Carbon Co., Ltd.) to be mixed therewith. After the hardness of the mixture was increased to the hardness of clay, stiffening (manipulation for sufficiently mixing them in a hard cake state) was carried out for three hours to apply shearing force to the mixture to sufficiently mix them. After the stiffening was completed, the mixture was filled in a disk-shaped mold (diameter: about 100 mm, thickness: 20 mm) to be molded by applying a pressure of 50 kg/cm$^2$ thereto at 130° C. for three minutes. After the mold was removed, the molded mixture was heated to a temperature of 1000° C. at a rate of temperature rise of 5° C./min under an atmosphere of nitrogen to be left to stand at the temperature for two hours to be burned, and then, the mixture was slowly cooled to prepare a disk having a diameter of 100 mm and a thickness of 20 mm. From the disk, a square bar (a lowly graphitized carbon rod (an amorphous carbon rod)) having a size of 6 mm×6 mm×70 mm was prepared. At the center of the amorphous carbon rod, a hole having a diameter of 3.2 mm and a depth of 50 mm was formed. Then, the corner portions of the square rod were removed with a sand paper to prepare an amorphous carbon rod having an octagonal cross section.

Then, a metal catalyst of the same mixed powder as that in Comparative Example 2 was filled in a hole of the amorphous carbon rod to prepare an anode, except that the powder obtained by forming the hole of the amorphous carbon rod and by removing the corner portions of the square rod to prepare the octagonal rod was used in place of the graphite powder (produced by Wako Pure Chemical Industries, Ltd.).

Then, soot containing synthesized single-walled carbon nanotubes was collected by the same method as that in Comparative Example 2, except that the anode thus prepared was used for causing currents of 30.0 A (current density: 1.01 A/mm$^2$), 40.0 A (current density: 1.34 A/mm$^2$), 50.0 A (current density: 1.68 A/mm$^2$), 60.0 A (current density: 2.01 A/mm$^2$), 70.0 A (current density: 2.35 A/mm$^2$) to flow through the anode for 3 minutes, 3 minutes, 3 minutes, 3 minutes and 5 minutes, respectively, to carry out annealing, and that a current of 80.0 A (current density: 2.68 A/mm$^2$) was caused to flow through the anode and cathode contacting therewith to carry out arc-discharge. Furthermore, in this example, the current density means a value obtained by dividing a current value by 29.82 mm$^2$ being the cross section of the rod.

Since the soot thus collected contained impurities in addition to single-walled carbon nanotubes, the impurities were removed by the same method as that in Comparative Example 2 to obtain purified single-walled carbon nanotubes.

(Evaluation of Carbon Rod Used as Anode in Example 2 and Comparative Example 2)

Figure 7:
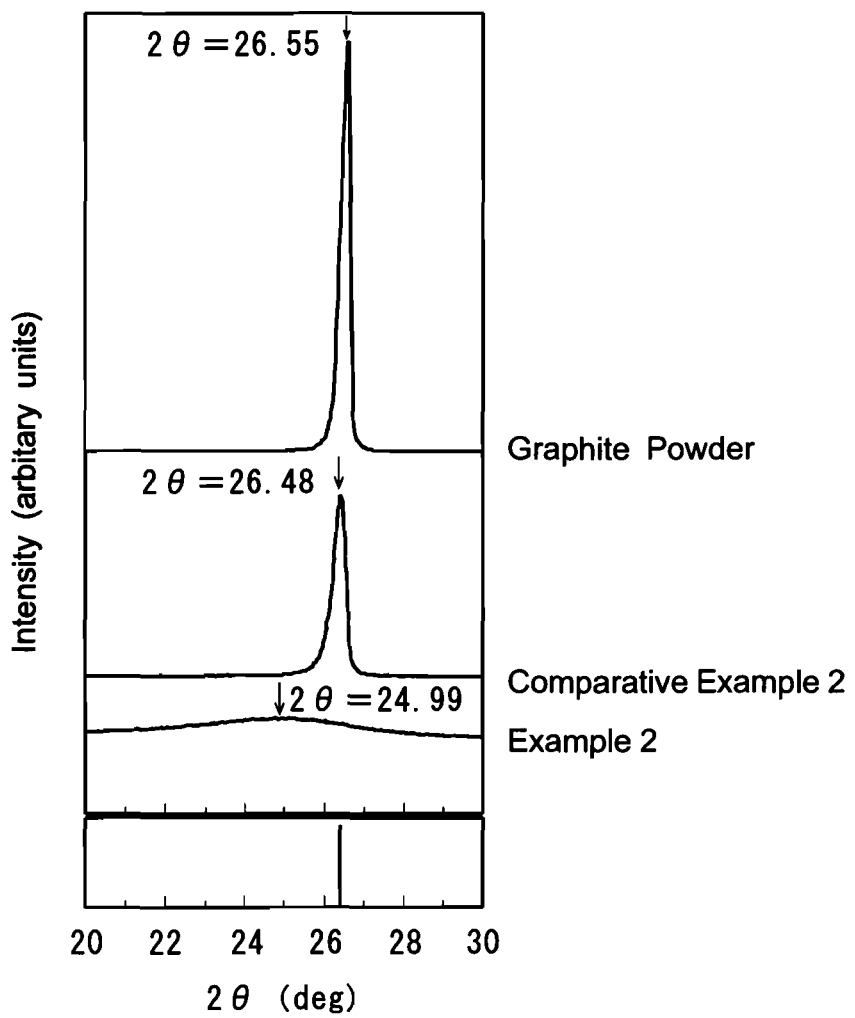
FIG. 7 is a chart showing the results of measurements of X-ray diffraction of an amorphous carbon rod, which was used as the anode in Example 2, a graphite rod used as the anode in Comparative Example 2, and a graphite powder as a reference.

FIG. 7 shows the X-ray diffraction (XRD) profiles of the amorphous carbon rod used as the anode in Example 2, the graphite rod used as the anode in Comparative Example 2, and a graphite powder (produced by Wako Pure Chemical Industries, Ltd.) as a reference.

In the theoretical XRD profile of graphite, a peak appears near a diffraction angle of 2θ=26.38°. This peak is derived from the (002) plane of hexagonal graphite. The mean spacing between lattice planes in the direction of C-axis of hexagonal graphite, i.e., the mean spacing d of the (002) planes, is 0.3379 nm on the basis of Bragg equation (d=λ/2 sin θ) assuming that the wavelength λ is 0.1541 nm of CuK a beam used as an X-ray source.

As shown in FIG. 7, in the XRD profiles of the graphite powder as the reference and the graphite rod used as the anode in Comparative Example 2, peaks appear at diffraction angles of 2θ=26.55° and 2θ=26.48°, respectively. Since crystallite develops over a long period, the intensity of diffraction is also large. For that reason, as shown in FIG. 7, the peaks having the high intensities of diffraction appear at diffraction angles of 2θ=26.55° and 2θ=26.48°, respectively. The mean spacing d between the (002) planes is 0.3357 nm and 0.3366 nm, respectively. Thus, the diffraction angle and the spacing d between the (002) planes correspond to those of the theoretical XRD profile of graphite, so that it can be seen that both of the graphite powder and the graphite rod have a highly developed graphite crystal structure. It is considered that the reason why the mean spacing is smaller than the mean spacing d between the (002) planes of hexagonal graphite is that rhombohedral graphite exists since the diffraction angle of rhombohedral graphite is 26.60° and since the spacing d between the (002) planes thereof is 0.3349 nm. It is considered that the reason for this is that stress is applied to the graphite powder for converting the structure of the graphite powder into the rhombohedral graphite when the graphite powder having the highly developed graphite structure is fined.

On the other hand, in the XRD profile of the amorphous carbon rod used as the anode in Example 2, broad peaks having low intensities of diffraction appear at diffraction angles of 2θ=24.99° and 2θ=24.55°, respectively, as shown in FIG. 7. The mean spacing d between the (002) planes is 0.3563 nm and 0.3626 nm, respectively. In the amorphous carbon rod used as the anode in Example 2, the diffraction angles of the peaks are shifted toward lower angles than those of the graphite powder and the graphite rod used as the anode in Comparative Example 2, so that the mean spacing d between the (002) planes are large values. The reason why such broad peaks having low intensities of diffraction are obtained and the diffraction angles of the peaks are shifted toward lower angles is that the number of carbon hexagonal net planes laminated in parallel is small, so that the randomness of the laminated planes is large. The reason why the mean spacing d between the (002) planes is the large value is that the carbon hexagonal net plates in amorphous carbon have the structure of randomized layers, not the structure of regular layers.

Figure 8:
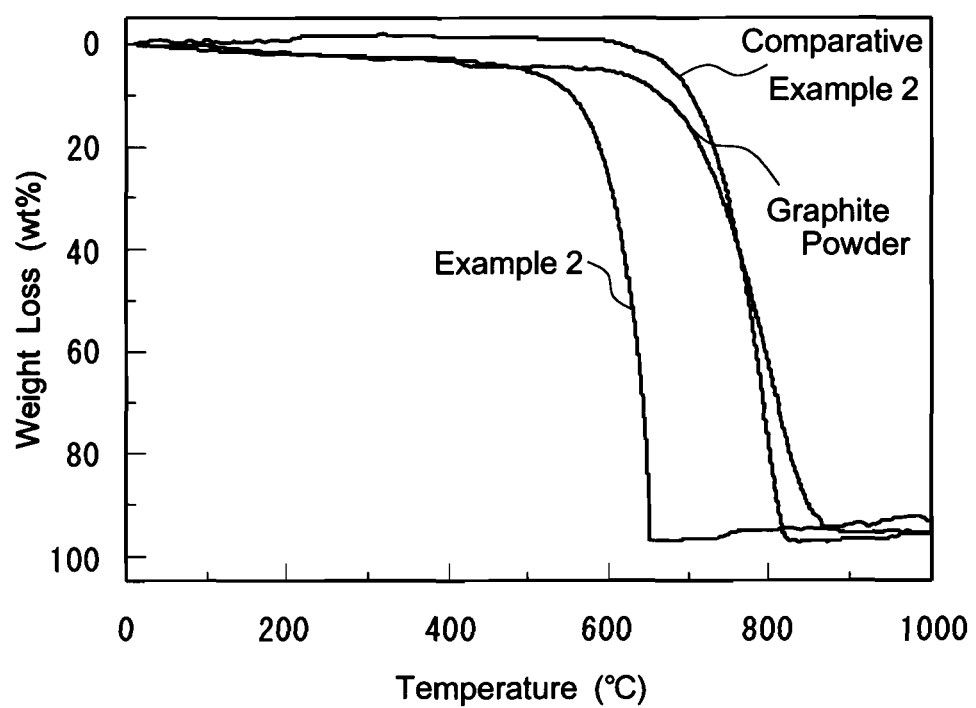
FIG. 8 shows weight loss percentage curves when the temperatures of the amorphous carbon rod used as the anode in Example 2, the graphite rod used as the anode in Comparative Example 2, and the graphite powder as a reference, were increased at a rate of temperature rise of 5° C./min in the atmosphere.

FIG. 8 shows weight loss percentage curves when the temperatures of the amorphous carbon rod used as the anode in Example 2, the graphite rod used as the anode in Comparative Example 2, and the graphite powder (produced by Wako Pure Chemical Industries, Ltd.) as a reference, were increased at a rate of temperature rise of 5° C./min in the atmosphere.

Since CO and $CO_2$ are generated if carbon materials react with oxygen, the temperatures at which carbon materials react with oxygen can be evaluated by the thermogravimetric analysis of carbon materials in the atmosphere. In general, the oxidation starting temperature is 700° C. in the case of graphite, whereas the oxidation starting temperature is in the range of from 400 to 600° C. in the case of lowly graphitized carbon materials although it depends on the graphitized degree. The reason why the oxidation starting temperature is thus decreased in lowly graphitized carbon materials is that such carbon materials have thermally unstable structures since a larger number of edges of graphine, the edges of which are reaction sites with oxygen and which has a size of a few nanometer, are exposed in the structure of randomized layers, which is not the graphite structure.

As shown in FIG. 8, it can be verified that the weight of the graphite powder as the reference and the weight of the graphite rod used as the anode in Comparative Example 2 start to decrease at about 600° C. On the other hand, the weight of the amorphous carbon rod used as the anode in Example 2 starts to decrease at about 500° C. It can be seen from these results that the amorphous carbon rod used as the anode in Example 2 is a lowly graphitized carbon rod which does not have the structure of regular layers and which has the structure of randomized layers.

(Evaluation of Single-Walled Carbon Nanotubes Produced in Example 2 and Comparative Example 2)

Figure 9A:
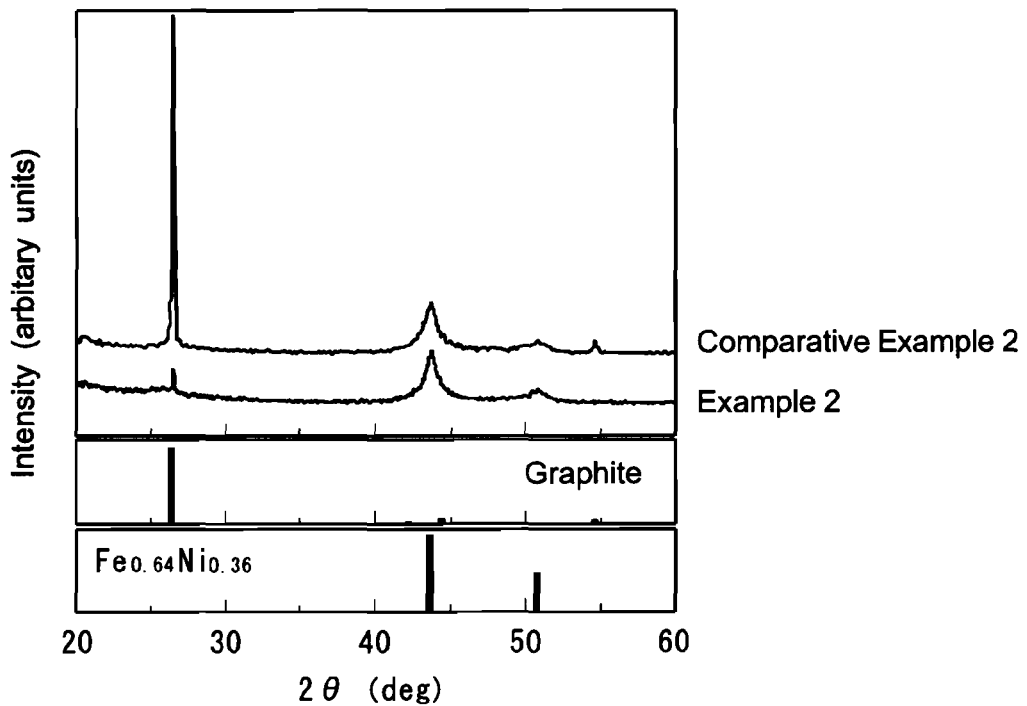
FIG. 9A is a chart showing the results of measurements of X-ray diffraction of crude soot produced by using the amorphous carbon rod as the anode in Example 2, and crude soot produced by using the graphite rod as the anode in Comparative Example 2, each crude soot being collected from the top plate of the chamber immediately after synthesis (before purification).
Figure 9B:
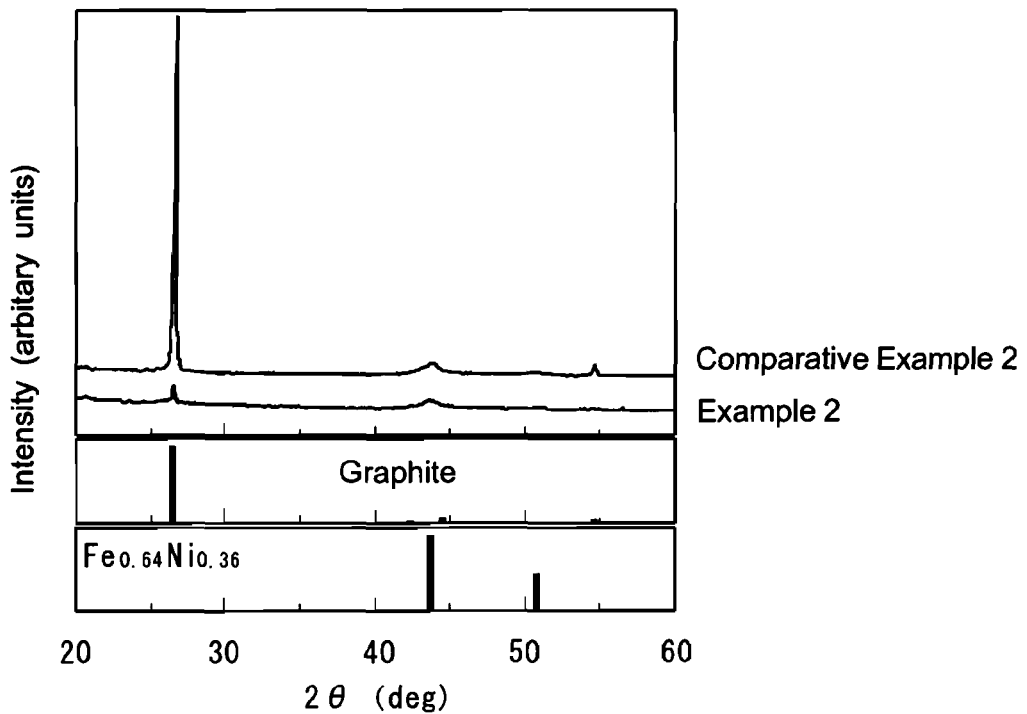
FIG. 9B is a chart showing the results of measurements of X-ray diffraction of crude soot produced by using the amorphous carbon rod as the anode in Example 2, and crude soot produced by using the graphite rod as the anode in Comparative Example 2, each crude soot being collected from the inner surface of the side wall of the chamber immediately after synthesis (before purification).
Figure 10A:
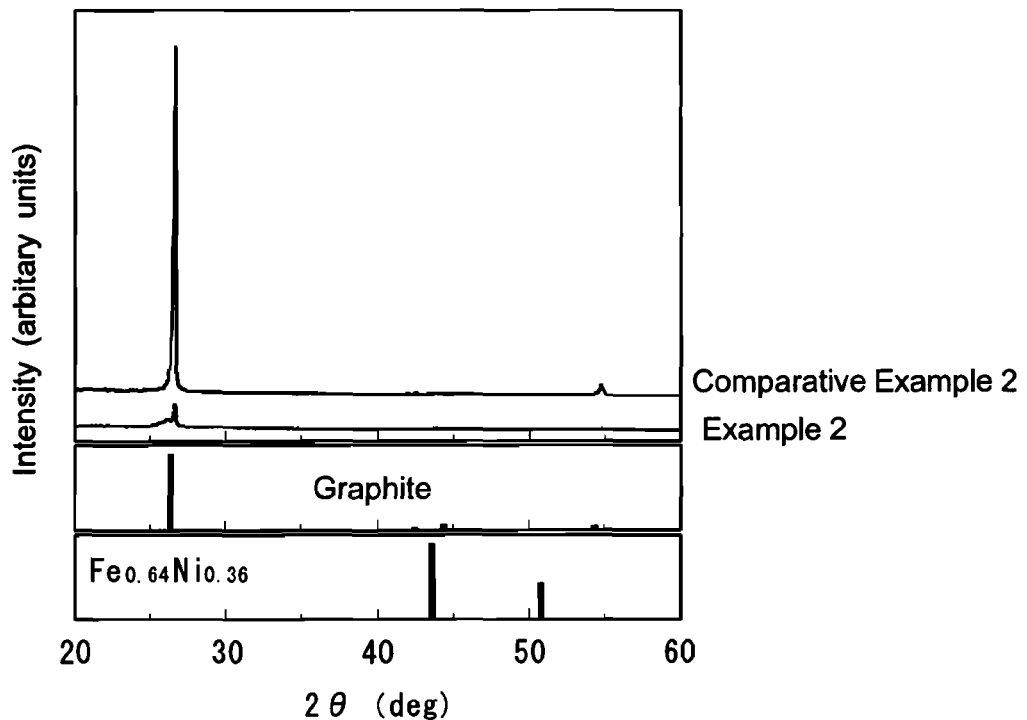
FIG. 10A is a chart showing the results of measurements of X-ray diffraction of purified soot obtained by purifying crude soot produced by using the amorphous carbon rod as the anode in Example 2, and purified soot obtained by purifying crude soot produced by using the graphite rod as the anode in Comparative Example 2, each crude soot being collected from the top plate of the chamber.
Figure 10B:
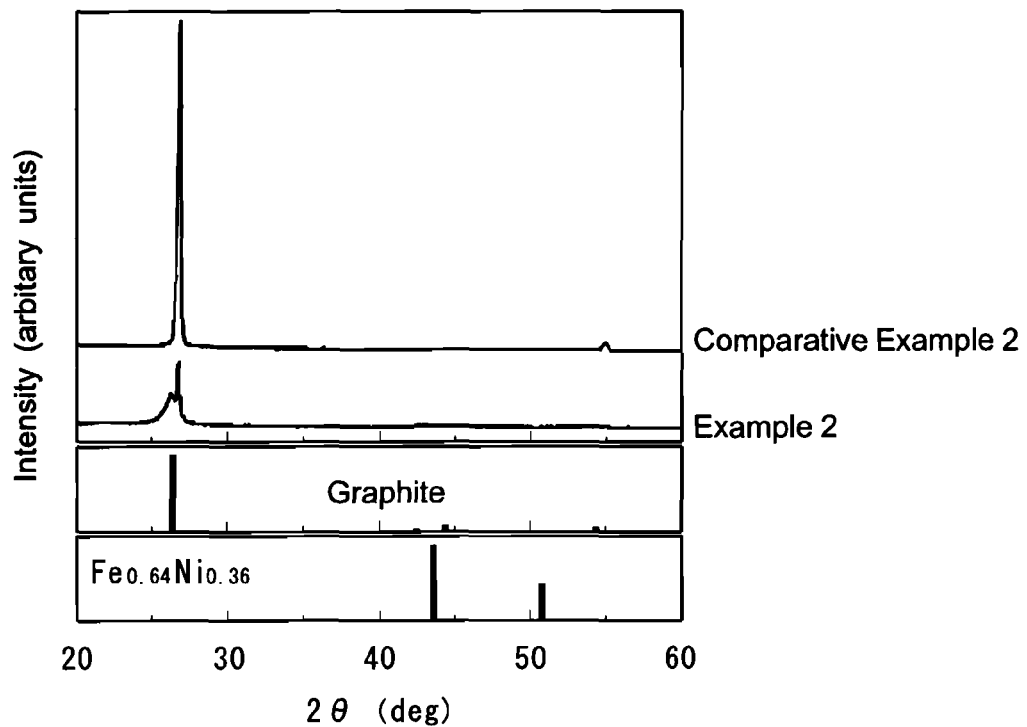
FIG. 10B is a chart showing the results of measurements of X-ray diffraction of purified soot obtained by purifying crude soot produced by using the amorphous carbon rod as the anode in Example 2, and purified soot obtained by purifying crude soot produced by using the graphite rod as the anode in Comparative Example 2, each crude soot being collected from the inner surface of the side wall of the chamber.

FIG. 9A shows the X-ray diffraction (XRD) profiles of crude soot produced by using the amorphous carbon rod as the anode in Example 2, and crude soot produced by using the graphite rod as the anode in Comparative Example 2, each crude soot being collected from the top plate of the chamber immediately after synthesis (before purification). FIG. 9B shows the X-ray diffraction (XRD) profiles of crude soot produced by using the amorphous carbon rod as the anode in Example 2, and crude soot produced by using the graphite rod as the anode in Comparative Example 2, each crude soot being collected from the inner surface of the side wall of the chamber immediately after synthesis (before purification). FIG. 10A shows the X-ray diffraction (XRD) profiles of purified soot obtained by purifying crude soot produced by using the amorphous carbon rod as the anode in Example 2, and purified soot obtained by purifying crude soot produced by using the graphite rod as the anode in Comparative Example 2, each crude soot being collected from the top plate of the chamber. FIG. 10B shows the X-ray diffraction (XRD) profiles of purified soot obtained by purifying crude soot produced by using the amorphous carbon rod as the anode in Example 2, and purified soot obtained by purifying crude soot produced by using the graphite rod as the anode in Comparative Example 2, each crude soot being collected from the inner surface of the side wall of the chamber.

As shown in these figures, peaks having high intensities of diffraction and being derived from the (002) plane of hexagonal graphite appear near 2θ=26.38° in the XRD profiles of crude soot collected from the top plate of the chamber and the inner surface of the side wall thereof immediately after synthesis in Comparative Example 2, and purified soot obtained by purifying the crude soot, so that it can be clearly seen that graphite is contained in the collected soot. Furthermore, the reason why the intensity of the peak for graphite is increased after purification is that, although the purity of carbon nanotubes increases, the concentration of graphite per unit volume increases since graphite remains without being oxidized even if it is burned at 500° C. in the atmosphere.

On the other hand, as shown in these figures, the peak for graphite (the peak near 2θ=26.38°) does not appear in the XRD profiles of crude soot collected from the top plate of the chamber and the inner surface of the side wall thereof immediately after being synthesized by using the amorphous carbon rod as the anode in Example 2, and purified soot obtained by purifying the crude soot. Furthermore, peaks appear near 2θ=26.19° and 2θ=26.38° in the XRD profiles of the purified soot after being collected from the top plate of the chamber and the inner surface of the side wall thereof. It is assumed that these peaks are derived from a very small amount of graphite, such as graphite capsule (for covering the metal catalyst) produced by arc-discharge. It can be seen that the purified soot after being collected from the top plate of the chamber and the inner surface of the side wall thereof includes the mixture of crystallites having different spacing of lattice planes, i.e., the mixture of graphite impurities having the structure of random layers and graphite impurities having the structure of regular lamination layers.

Although the peaks (the peaks near 2θ=43.6° and 2θ=50.8°) derived from the metal catalyst (Fe and Ni) appear in the XRD profile of the crude soot immediately after synthesis (crude soot being collected from the top plate of the chamber and the inner surface of the side wall thereof), the peaks do not appear in the XRD profile of the purified soot, so that it can be seen that the metal catalyst is removed by purification.

After each of crude soot produced by using the amorphous carbon rod as the anode in Example 2, and crude soot produced by using the graphite rod as the anode in Comparative Example 2 was collected from the inner surface of the side wall of the chamber, the soot thus obtained immediately after synthesis (before purification) was observed by means of the scanning electron microscope (SEM). Thus, in both of the SEM images, there were observed small metal catalyst particles having a size of about 10 to 15 nm, amorphous carbon surrounding the metal catalyst particles, and fibrous single-walled carbon nanotubes.

After each of crude soot produced by using the amorphous carbon rod as the anode in Example 2, and crude soot produced by using the graphite rod as the anode in Comparative Example 2 was collected from the inner surface of the side wall of the chamber to be purified, the soot thus purified was observed by means of the scanning electron microscope (SEM). Thus, it was observed that the metal catalyst particles and amorphous carbon were removed, and it was verified that the single-walled carbon nanotubes were highly purified. In the SEM image of the soot obtained by purifying crude soot collected from the inner surface of the side wall of the chamber after being produced by using the graphite rod as the anode in Comparative Example 2, there was observed a lump having a similar shape to that in the SEM image of the graphite rod or graphite powder. It is considered that this lump is a part (a lump of graphite) of the anode entrapped by sputtering. In the SEM image of the soot obtained by purifying crude soot collected from the inner surface of the side wall of the chamber after being produced by using the amorphous carbon rod as the anode in Example 2, there were observed particles having diameters of about 30 to 150 nm and small particles having diameters of about 10 nm, the particles having a similar shape to that in the SEM image of the amorphous carbon rod used as the anode. It is considered that the particles having diameters of about 30 to 150 nm are particles entrapped by sputtering from the anode, and it is also considered that the small particles having diameters of about nm are graphite produced from atomic carbon evaporated and sublimated by arc-discharge.

After each of crude soot produced by using the amorphous carbon rod as the anode in Example 2, and crude soot produced by using the graphite rod as the anode in Comparative Example 2 was collected from the inner surface of the side wall of the chamber, the Raman scattering spectrometry of each of the crude soot obtained immediately after synthesis (before purification), and the purified soot obtained by purifying the crude soot was carried out. As a result, in Example 2, the ratios (G/D) of the intensities of Raman spectra of the crude soot obtained immediately after synthesis (before purification) and the purified soot obtained after purification were 13.8-14.1 and 92.7-113.2, respectively. In Comparative Example 2, the ratios (G/D) of the intensities of Raman spectra of the crude soot obtained immediately after synthesis (before purification) and the purified soot obtained after purification were 28.6-41.2 and 76.0-80.0, respectively. These results are shown in Table 3.

TABLE 3

|  | Comparative Example 2 | Example 2 |
| --- | --- | --- |
| Immediately After Synthesis | 28.6-41.2 | 13.8-14.1 |
| After Purification | 76.0-80.0 | 92.7-113.2 |

As can be seen from Table 3, in the purified soot obtained by purifying crude soot collected from the inner surface of the side wall of the chamber after being produced by using the amorphous carbon rod as the anode in Example 2, the ratio (G/D) of the intensity of Raman spectra is in the very high range of from 92.7 to 113.2, so that the purify of the carbon nanotubes is very high. This means that the amount of impurities was greatly decreased to greatly increase the purity of the carbon nanotubes in accordance with the greatly decreased amount of graphite per unit volume.

The invention claimed is:

1. A method for producing a carbon nanotube comprising the steps of:
   preparing an amorphous carbon rod by burning a mixture consisting of carbon black and coal-tar pitch;
   preparing an anode by filling a metal catalyst in a hole formed in the amorphous carbon rod;
   producing soot containing a carbon nanotube by arc-discharge using the anode; and
   purifying the produced soot.

2. A method for producing a carbon nanotube as set forth in claim 1, wherein said anode contains 50 wt % or more of amorphous carbon.

3. A method for producing a carbon nanotube as set forth in claim 1, wherein said metal catalyst is a mixed powder consisting of Fe, Ni and S.

4. A method for producing a carbon nanotube as set forth in claim 1, wherein said purifying step includes a first burning and oxidizing step of heating said soot at a temperature of not lower than 350° C. in the atmosphere to burn and oxidize said soot.

5. A method for producing a carbon nanotube as set forth in claim 4, wherein said purifying step further includes a first acid treatment step of immersing soot, which is obtained at said first burning and oxidizing step, in an acid.

6. A method for producing a carbon nanotube as set forth in claim 5, wherein said purifying step further includes a second burning and oxidizing step of heating soot, which is obtained at said first acid treatment step, at a temperature, which is not lower than the heating temperature at said first burning and oxidizing step and which is not lower than 500° C., to burn and oxidize the soot.

7. A method for producing a carbon nanotube as set forth in claim 6, wherein said purifying step further includes a second acid treatment step of immersing soot, which is obtained at said second burning and oxidizing step, in an acid.

8. A method for producing a carbon nanotube as set forth in claim 7, wherein said purifying step further includes a heating step under vacuum of heating soot, which is obtained at said second acid treatment step, in vacuum.

9. A method for producing a carbon nanotube as set forth in claim 8, wherein the heating temperature at said heating step under vacuum is not lower than 1000° C.

10. A method for producing a carbon nanotube as set forth in claim 1, wherein said carbon nanotube is a single-walled carbon nanotube.

11. A method for producing a carbon nanotube as set forth in claim 1, wherein said metal catalyst is a mixed powder which consists of a mixed powder of Fe, Ni, S and CFx and a powder of said amorphous carbon rod, the powder of said amorphous carbon rod being obtained by forming said hole in said amorphous carbon rod.

* * * * *